(12) United States Patent
Clinch et al.

(10) Patent No.: US 6,692,206 B1
(45) Date of Patent: Feb. 17, 2004

(54) SPLIT WELD CAGE NUT ASSEMBLY

(75) Inventors: James P. Clinch, Sterling Heights, MI (US); Gary Puzzella, Logansport, IN (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/222,269

(22) Filed: Aug. 16, 2002

(51) Int. Cl.[7] .............................. F16B 37/06; F16B 37/08
(52) U.S. Cl. ..................... 411/171; 411/111; 411/432
(58) Field of Search ..................... 411/103, 111, 411/112, 113, 171, 432; 29/428

(56) References Cited

U.S. PATENT DOCUMENTS

| | | |
|---|---|---|
| 2,649,883 A | 8/1953 | Sharp |
| 3,025,897 A | 3/1962 | Gieleghem |
| 3,177,916 A | 4/1965 | Rosan |
| 3,556,570 A | 1/1971 | Cosenza |
| 3,695,324 A | 10/1972 | Gulistan |
| 3,765,078 A | 10/1973 | Gulistan |
| 3,785,421 A | 1/1974 | Launay |
| 4,036,692 A * | 7/1977 | Walton .................... 411/171 X |
| 4,186,787 A | 2/1980 | Hussain |
| 4,193,435 A | 3/1980 | Charles et al. |
| 4,557,650 A | 12/1985 | Molina |
| 4,732,518 A | 3/1988 | Toosky |
| 4,762,451 A | 8/1988 | Collins |
| 4,875,817 A * | 10/1989 | Suzumura et al. .......... 411/171 |
| 5,066,180 A | 11/1991 | Lang et al. |
| 5,096,349 A | 3/1992 | Landy et al. |
| 5,096,350 A | 3/1992 | Peterson |
| 5,245,743 A | 9/1993 | Landy et al. |
| 5,380,136 A | 1/1995 | Copple et al. |
| 5,405,228 A | 4/1995 | Reid et al. |
| 5,468,104 A | 11/1995 | Reid et al. |
| 5,533,850 A * | 7/1996 | Ishihara et al. ............. 411/171 |
| 5,630,686 A | 5/1997 | Billmann |
| 5,704,747 A | 1/1998 | Hutter, III et al. |
| 5,893,694 A | 4/1999 | Wilusz et al. |
| 6,077,010 A | 6/2000 | Reid et al. |
| 6,146,071 A | 11/2000 | Norkus et al. |
| 6,183,180 B1 | 2/2001 | Copple et al. |

FOREIGN PATENT DOCUMENTS

DE  1055719  4/1959

* cited by examiner

*Primary Examiner*—Neill Wilson
(74) *Attorney, Agent, or Firm*—Trexler, Bushnell, Giangiorgi, Blackstone & Marr, Ltd.

(57) ABSTRACT

The invention provides a cage nut assembly having a nut member and a cage member. The nut has a threaded aperture therethrough. The cage is capable of encaging the nut such that the nut has a limited range of movement within the cage in at least one dimension. The cage has an aperture therein sized and located to allow access to the threaded aperture of the nut within the range of movement of the nut. The cage has a plurality of protrusions, such as dimples or tabs, extending therefrom. At least one of the protrusions is formed in halves which abut against one another to define a seam therebetween. The protrusions are capable of being welded to a mating surface to secure the cage to a mating surface, and, substantially contemporaneously, the halves of the at least one protrusion are capable of being welded together along the seam.

18 Claims, 10 Drawing Sheets

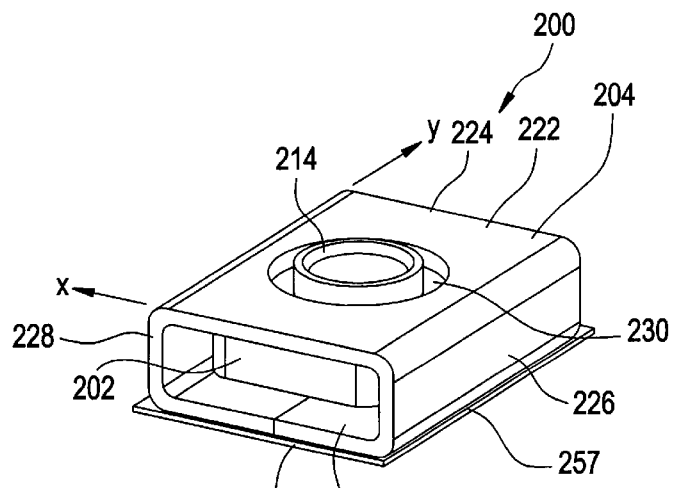
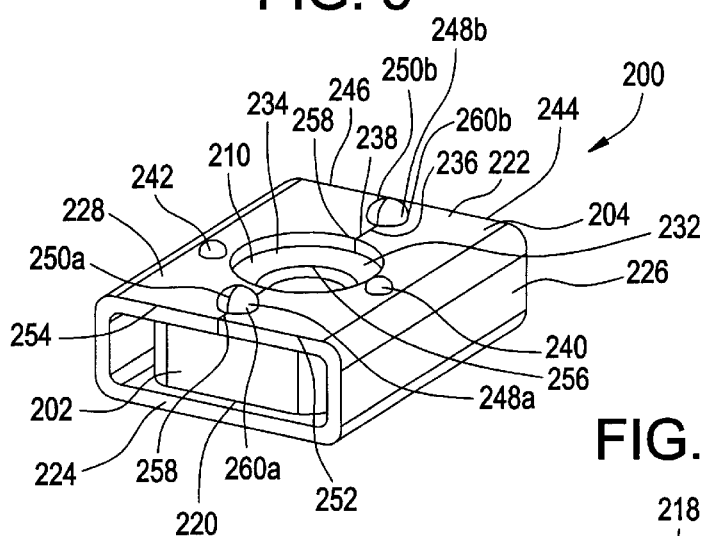
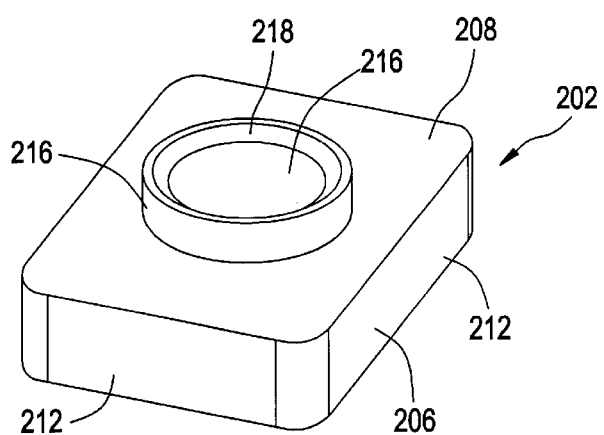

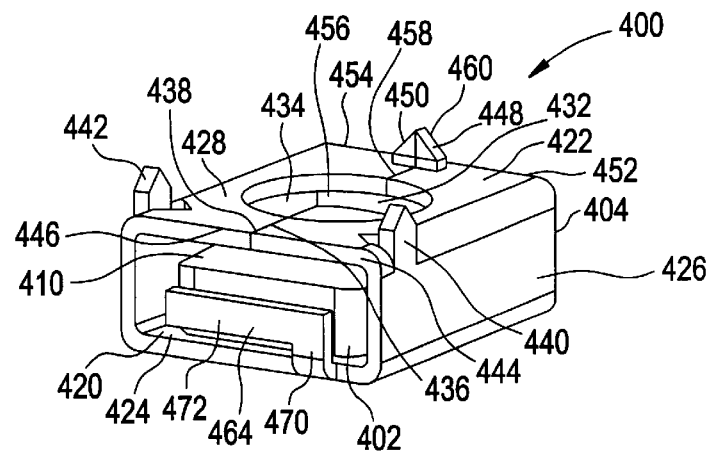
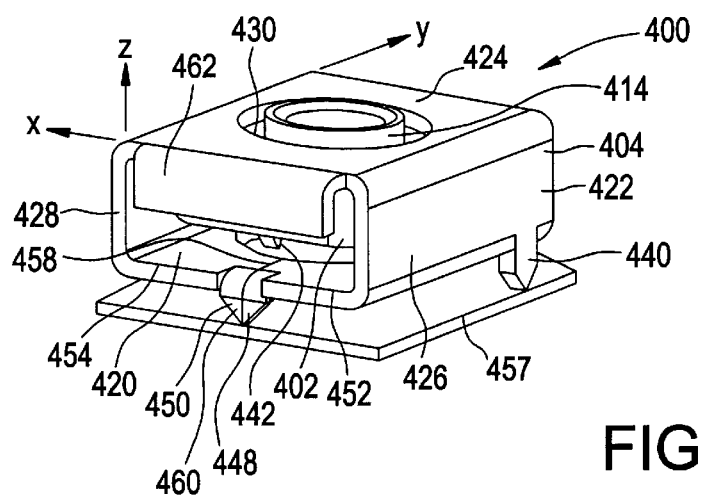
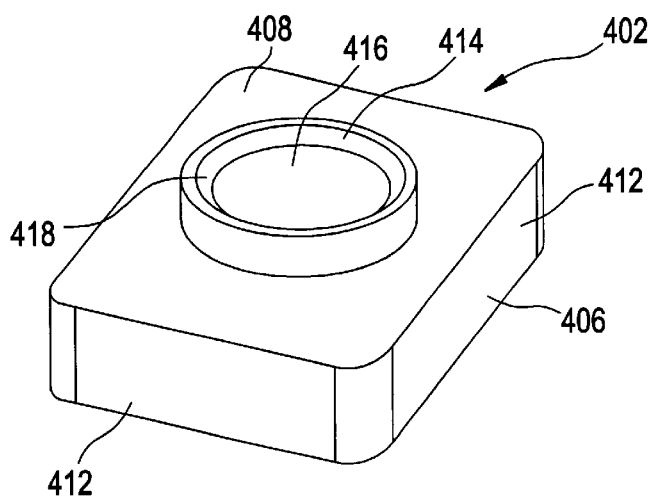

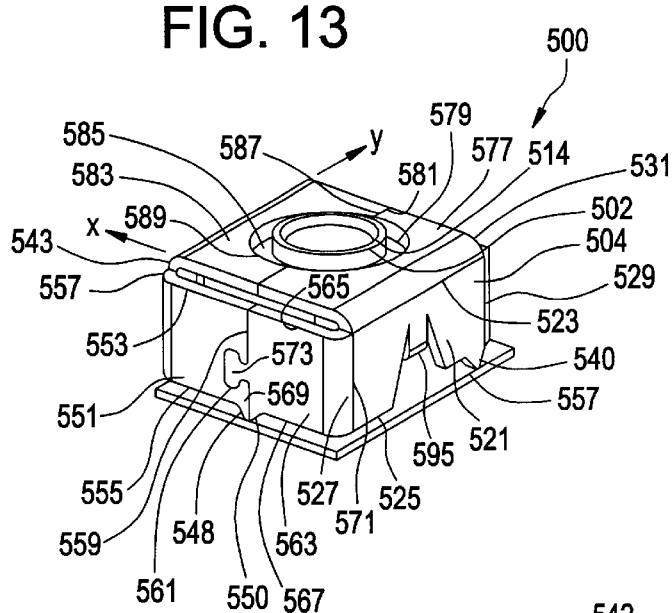
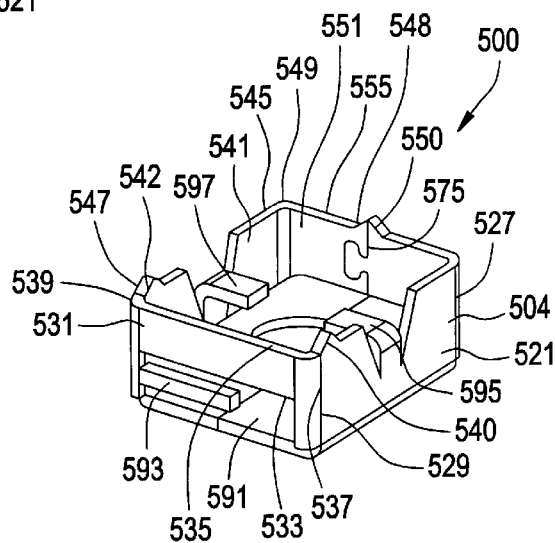
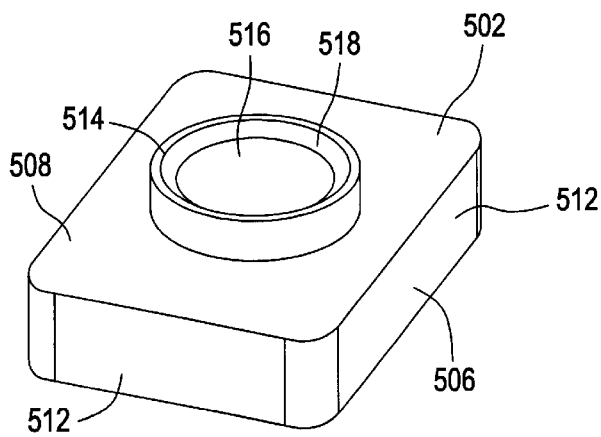

FIG. 22

```
Providing a cage member having a body defining
a seam and having at least one protrusion, the
protrusion being formed in halves which abut against
one another such that the seam is provided therebetween
                    │
                    ▼
    Positioning the protrusions on a mating surface
                    │
                    ▼
    Welding the protrusion to the mating surface such
        that halves of the protrusion are welded
              together along the seam
```

SPLIT WELD CAGE NUT ASSEMBLY

BACKGROUND OF THE INVENTION

The present invention generally relates to a cage nut assembly, and more specifically relates to a cage nut assembly which is configured such that it meets torque requirements while having a relatively thin wall thickness.

Cage nut assemblies are well known in the art and provide a useful function in that they are able to hold a threaded nut at locations in a frame that are difficult or in some cases impossible to reach. Cage nut assemblies are used in vehicles for seat attachments, radiator attachments, chassis to drive train attachments, and for any other nut application that requires the nut to have an "X" and "Y" axis adjustability.

Currently, the thickness of the cage in these cage nut assemblies is determined by the amount of torque that the part can handle as the cage is not a continuous 360 degree connection, meaning that there is a seam/gap in the cage. Thus, to prevent the gap from expanding, the cage must have a material thickness which can take the full force of the torque. If sufficient thickness is not used, during driving torque, the nut will push out the side walls of the cage (thereby causing the seam to expand) until the nut is free to spin, stopping the nut bolt assembly. Thus, cage nut assemblies generally have cage walls which are excessively thick, for instance, a thickness of 2.0 millimeters at a minimum, in order to meet torque requirements.

It would be advantageous to make a cage nut assembly which can accommodate the required torque with a relatively thin cage wall. It would also be advantageous to make a cage nut assembly which can be utilized in any desired application which requires an "X" and "Y" axis adjustability.

OBJECTS AND SUMMARY

A primary object of an embodiment of the present invention is to provide a cage nut assembly that has a relatively thin wall thickness, but which meets torque requirements in a desired application.

Another object of an embodiment of the present invention is to provide a cage nut assembly which is relatively inexpensive to manufacture but which meets torque requirements in a desired application.

Another object of an embodiment of the present invention is to provide a cage nut assembly which can be utilized in any nut application that requires the nut to have an "X" and "Y" axis adjustability.

Briefly, and in accordance with the foregoing, embodiments of the present invention provide a cage member for a cage nut assembly. The cage member has protrusions stamped into the cage member material. At least one of the protrusions is formed in halves. These halves are stamped at the edge of the material exactly opposite of a mating half on the other side. When the cage member is wrapped around to its final position, the two halves butt up against each other to mimic a full protrusion. The other protrusions are not placed on the cage seam. A nut is in the cage member when the final cage member bending operation butts the two cage edges against each other.

A cage member which is in accordance with an embodiment of the present invention can take many forms. For example, the cage member may have flanges on the end thereof which allow access to a nut encaged within the cage member and to allow positioning of the nut after welding of the cage member to the mating surface. The cage member may wrap around and join together with a dove-tail interlocking system. The cage member may provide that the protrusion is not split into halves but rather is off-set such that the protrusion is designed to interface with the wall of the cage member during the welding process.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 4 is a perspective view of a cage nut assembly which is in accordance with a second embodiment of the present invention;

FIG. 5 is a perspective view of the cage nut assembly shown in FIG. 4, where in FIG. 5, the cage nut assembly is rotated 180 degrees relative to FIG. 4;

FIG. 6 is a perspective view of a nut member of the cage nut assembly shown in FIGS. 4 and 5;

FIG. 10 is a perspective view of a cage nut assembly which is in accordance with a fourth embodiment of the present invention;

FIG. 11 is a perspective view of the cage nut assembly shown in FIG. 10, where in FIG. 11, the cage nut assembly is rotated 180 degrees relative to FIG. 10;

FIG. 12 is a perspective view of a nut member of the cage nut assembly shown in FIGS. 10 and 11;

FIG. 13 is a perspective view of a cage nut assembly which is in accordance with a fifth embodiment of the present invention;

FIG. 14 is a perspective view of a cage member of the cage nut assembly shown in FIG. 13;

FIG. 15 is a perspective view of a nut member of the cage nut assembly shown in FIG. 13;

FIG. 22 illustrates a method of attaching a cage member of the cage nut assembly shown in FIGS. 1, 4, 7, 10, 13 and 19 to a mating surface;

DETAILED DESCRIPTION OF THE ILLUSTRATED EMBODIMENTS

Figure 1:
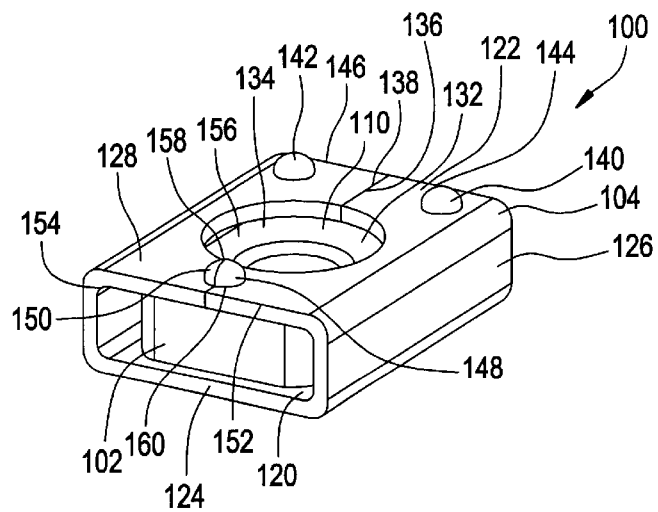
FIG. 1 is a perspective view of a cage nut assembly which is in accordance with an embodiment of the present invention.

While this invention may be susceptible to embodiment in different forms, specific embodiments of the invention are shown in the drawings and will be described herein in detail with the understanding that the present disclosure is to be considered an exemplification of the principles of the invention, and is not intended to limit the invention to that as illustrated.

The figures show several embodiments of the present invention. Each embodiment provides a cage nut assembly 100, 200, 300, 400, 500, 600, 700 which is configured such that it can have a cage member 104, 204, 304, 404, 504, 604, 704 with a relatively thin wall thickness, yet meet torque requirements in a desired application. Each embodiment also provides a cage nut assembly 100, 200, 300, 400, 500, 600, 700 which is relatively inexpensive to manufacture but which meets torque requirements in a desired application. Further, each embodiment provides a cage nut assembly 100, 200, 300, 400, 500, 600, 700 which can be utilized in any nut application that requires a nut member 102, 202, 302, 402, 502, 602, 702 to have an "X" and "Y" axis adjustability.

Figure 2:
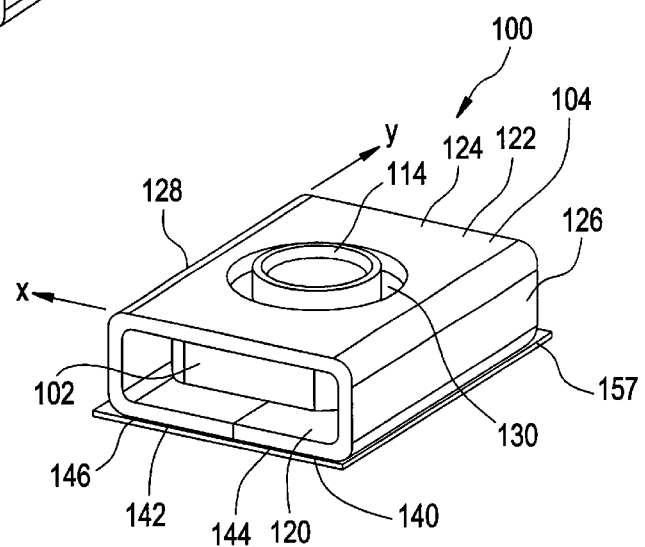
FIG. 2 is a perspective view of the cage nut assembly shown in FIG. 1, where in FIG. 2, the cage nut assembly is rotated 180 degrees relative to FIG. 1.
Figure 3:
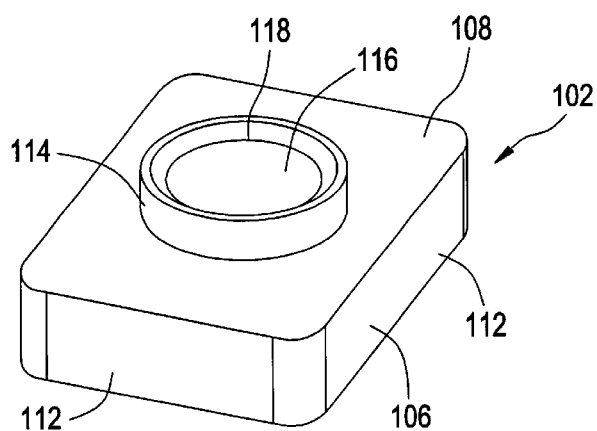
FIG. 3 is a perspective view of a nut member of the cage nut assembly shown in FIGS. 1 and 2.
Figure 7:
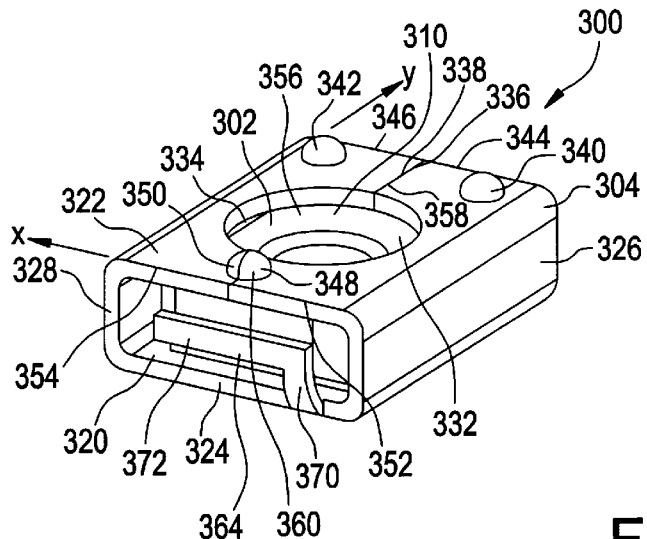
FIG. 7 is a perspective view of a cage nut assembly which is in accordance with a third embodiment of the present invention.
Figure 8:
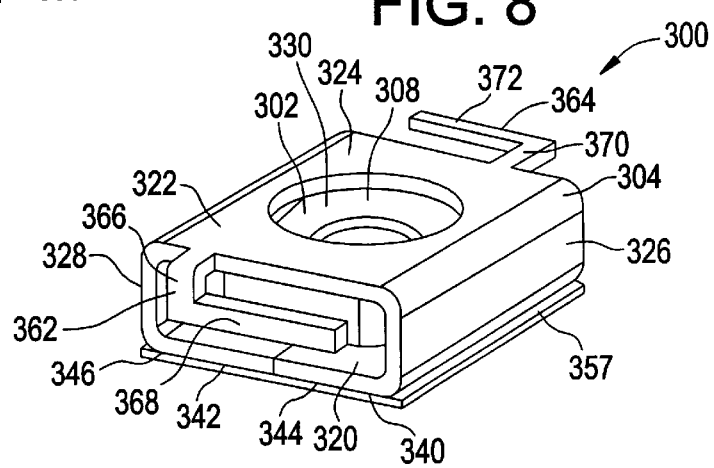
FIG. 8 is a perspective view of the cage nut assembly shown in FIG. 7, where in FIG. 8, the cage nut assembly is rotated 180 degrees relative to FIG. 7.
Figure 9:
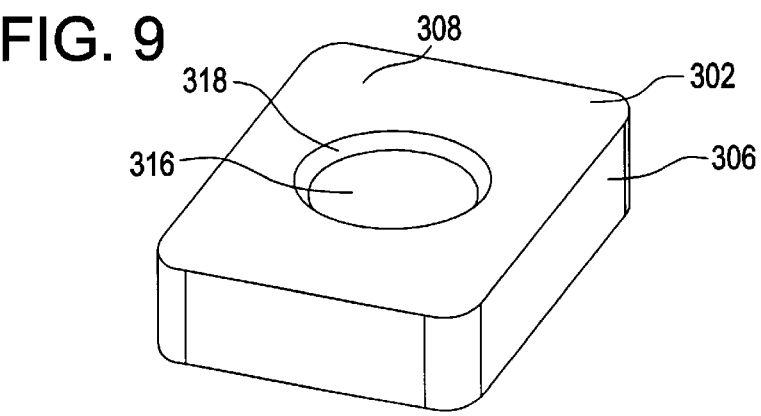
FIG. 9 is a perspective view of a nut member of the cage nut assembly shown in FIGS. 7 and 8.
Figure 16:
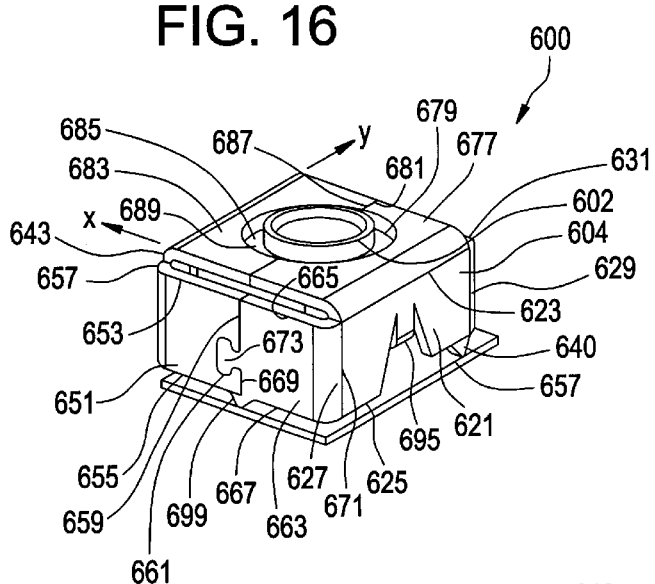
FIG. 16 is a perspective view of a cage nut assembly which is in accordance with a sixth embodiment of the present invention.
Figure 17:
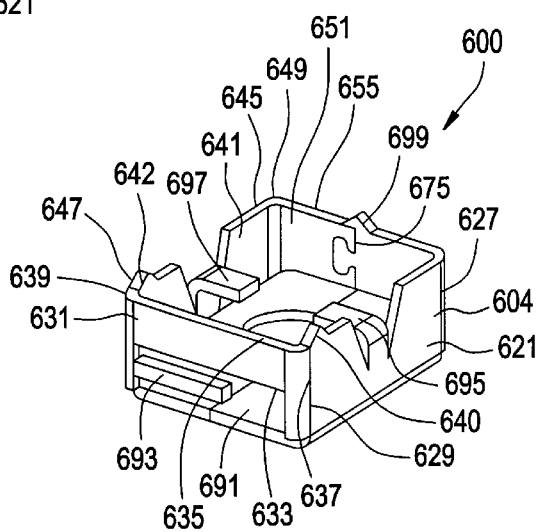
FIG. 17 is a perspective view of a cage member of the cage nut assembly shown in FIG. 16.
Figure 18:
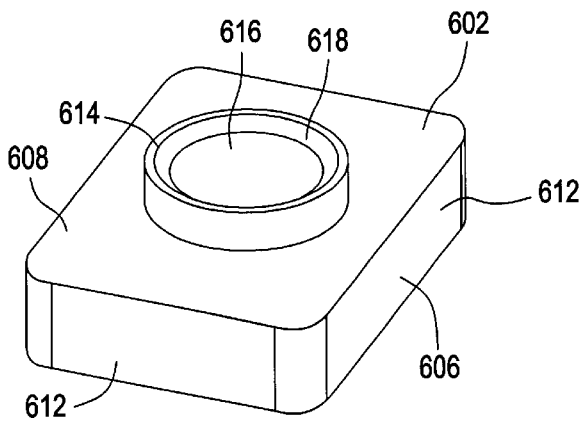
FIG. 18 is a perspective view of a nut member of the cage nut assembly shown in FIG. 16.
Figure 19:
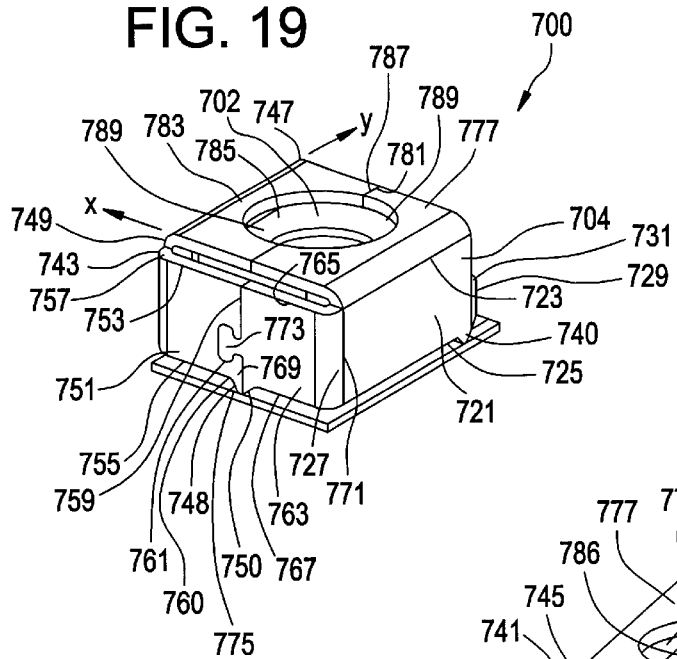
FIG. 19 is a perspective view of a cage nut assembly which is in accordance with a seventh embodiment of the present invention.
Figure 20:
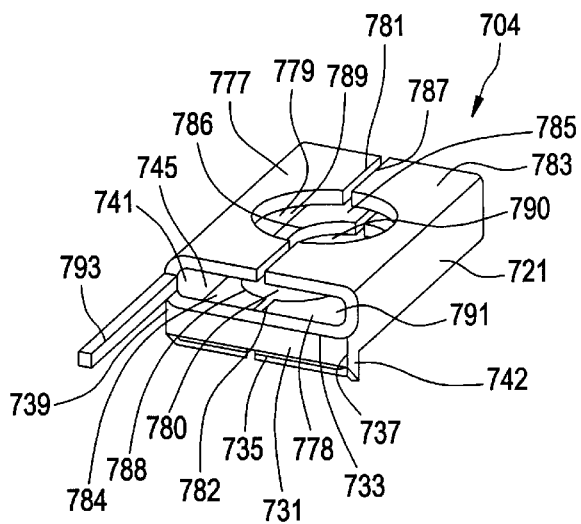
FIG. 20 is a perspective view of a cage member of the cage nut assembly shown in FIG. 19.
Figure 21:
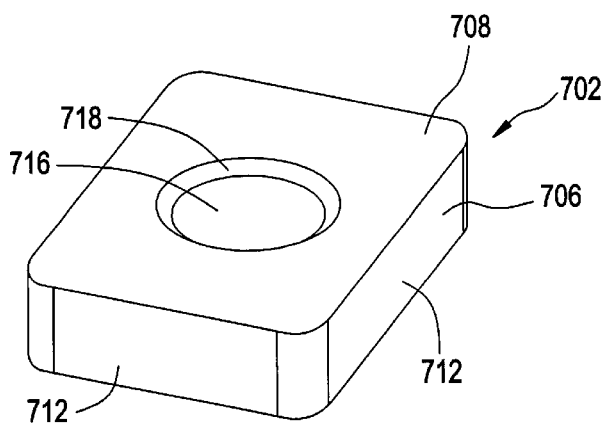
FIG. 21 is a perspective view of a nut member of the cage nut assembly shown in FIG. 19.

A cage nut assembly 100 which is in accordance with a first embodiment of the present invention is shown in FIGS. 1–3; a cage nut assembly 200 which is in accordance with a second embodiment of the present invention is shown in FIGS. 4–6; a cage nut assembly 300 which is in accordance with a third embodiment of the present invention is shown in FIGS. 7–9; a cage nut assembly 400 which is in accordance with a fourth embodiment of the present invention is shown in FIGS. 10–12; a cage nut assembly 500 which is in accordance with a fifth embodiment of the present invention is shown in FIGS. 13–15; a cage nut assembly 600 which is in accordance with a sixth embodiment of the present invention is shown in FIGS. 16–18; and a cage nut assembly 700 which is in accordance with a seventh embodiment of the present invention is shown in FIGS. 19–21. Like elements are denoted with like reference numerals with the first embodiment being in the one hundreds, the second embodiment being in the two hundreds, the third embodiment being in the three hundreds, the fourth embodiment being in the four hundreds, the fifth embodiment being in the five hundreds, the sixth embodiment being in the six hundreds, and the seventh embodiment being in the seven hundreds.

Attention is now directed to FIGS. 1–3 which illustrate a cage nut assembly 100 which is in accordance with a second embodiment of the present invention. The cage nut assembly 100 includes a nut member 102 and a cage member 104.

The nut member 102 is best illustrated in FIG. 3 and includes a rectangular block 106 having a generally planar upper surface 108, a generally planar lower surface 110 and sidewalls 112 which connect the upper and lower surfaces 108, 110. The nut member 102 also includes a cylindrical member 114 which extends outwardly from the upper surface 108 of the nut member 102. The cylindrical member 114 is preferably in the form of a right circular cylinder. An aperture 116 extends through the nut member 102 from the block 106 into the cylindrical member 114. The aperture 116 may be closed at the lower surface 110 of the block 106 or it may extend all the way through the block 106. The aperture 116 defines an aperture wall 118 which is preferably threaded and is capable of receiving a bolt or screw (now shown) to be attached thereto.

The cage member 104 is best illustrated in FIGS. 1 and 2. The cage member 104 is used for encaging the nut member 102. Prior to encaging the nut member 102, the cage member 104 has generally planar upper and lower surfaces 120, 122. The cage member 104 includes a base portion 124 and bendable first and second arm portions 126, 128 extending from opposite ends of the base portion 124. The first and second arm portions 126, 128 are preferably integrally formed with the base portion 124.

An aperture 130 is provided through the base portion 124 of the cage member 104 and the first and second arms 126, 128 have generally semicircular cutouts 132, 134 at their free ends 136, 138.

The first and second arms 126, 128 have dimples 140, 142 provided on the lower surface 122 thereof which are formed from a stamping process and which extend outwardly from the lower surface 122 thereof. The dimples 140, 142 are provided between the semicircular cutouts 132, 134 and the edges 144, 146 of the arms 126, 128.

The first and second arms 126, 128 have half-dimples 148, 150 provided on the lower surface 122 thereof at the free ends 136, 138 of the arms 126, 128. The half-dimples 148, 150 are formed from a stamping process and extend outwardly from the lower surface 122 of the arms 126, 128. The half-dimples 148, 150 are provided between the semicircular cutouts 132, 134 and the edges 152, 154 of the arms 126, 128.

In operation, the cylindrical member 114 of the nut member 102 is positioned through the aperture 130 of the cage member 104 such that the upper surface 108 of the nut member 102 is abutted against the upper surface 120 of the base portion 124 of the cage member 104. The first and second arms 126, 128 are then bent around opposite sidewalls 110 of the nut member 102 and onto the lower surface 110 of the nut member 102 to form the cage nut assembly 100.

The free ends 136, 138 of the arms 126, 128 then abut against one another such that the half-dimples 148, 150 abut against one another and the semicircular cutouts 132, 134 are in communication with one another to form a circular cutout 156.

Because the arms 126, 128 abut at their free ends 136, 138, the cage member 104 effectively encages the nut member 102. The cage member 104 and the aperture 130 are sized so that the nut member 102 has a limited range of movement in at least one dimensions and preferably in two dimensions, for example the "X" and "Y" axes as illustrated in FIG. 2. The circular cutout 156 is provided in the cage member 104 to allow access to the aperture 116 of the nut member 102 through the lower surface 110 thereof, within the range of movement of the nut member 102.

Once the cage nut assembly 100 is formed, the cage nut assembly 100 must then be attached to a mating surface 157. The cage nut assembly 100 is positioned on the mating surface 157 such that the dimples 140, 142, 148, 150 are in contact with the mating surface 157. The cage nut assembly 100 is then welded to the mating surface 157 with the assistance of the dimples 540, 542. During the welding, the free-ends 136, 138 are welded together to form a welded seam 158. The half-dimples 148, 150 also assist in the welding of the cage nut assembly 100 to the mating surface 157 and are welded together to form a welded dimple 160.

Attention is now directed to FIGS. 4–6 which illustrate a cage nut assembly 200 which is in accordance with a second embodiment of the present invention. The cage nut assembly 200 includes a nut member 202 and a cage member 204.

The nut member 202 is best illustrated in FIG. 6 and includes a rectangular block 206 having a generally planar upper surface 208, a generally planar lower surface 210 and sidewalls 212 which connect the upper and lower surfaces 208, 210. The nut member 202 also includes a cylindrical member 214 which extends outwardly from the upper surface 208 of the nut member 202. The cylindrical member 214 is preferably in the form of a right circular cylinder. An aperture 216 extends through the nut member 202 from the block 206 into the cylindrical member 214. The aperture 216 may be closed at the lower surface 210 of the block 206 or it may extend all the way through the block 206. The aperture 216 defines an aperture wall 218 which is preferably threaded and is capable of receiving a bolt or screw (now shown) to be attached thereto.

The cage member 204 is best illustrated in FIGS. 4 and 5. The cage member 204 is used for encaging the nut member 202. Prior to encaging the nut member 202, the cage member 204 has generally planar upper and lower surfaces 220, 222. The cage member 204 includes a base portion 224 and bendable first and second arm portions 226, 228 extending from opposite ends of the base portion 224. The first and second arm portions 226, 228 are preferably integrally formed with the base portion 224.

An aperture 230 is provided through the base portion 224 of the cage member 204 and the first and second arms 226, 228 have generally semicircular cutouts 232, 234 at their free ends 236, 238.

The first and second arms 226, 228 have dimples 240, 242 provided on the lower surface 222 thereof which are formed from a stamping process and which extend outwardly from the lower surface 222 thereof. The dimples 240, 242 are provided proximate to the semicircular cutouts 232, 234 and are provided equidistantly between the edges 244, 246 and the edges 252, 254 of the arms 226, 228.

The first and second arms 226, 228 have half-dimples 248a, 248b; 250a, 250b provided on the lower surface 222 thereof at the free ends 236, 238 of the arms 236, 238. The half-dimples 248a, 248b; 250a, 250b are formed from a stamping process and extend outwardly from the lower surface 222 of the arms 226, 228. The half-dimples 248a, 250a are provided between the semicircular cutouts 232, 234 and the edges 244, 246 of the arms 226. 228. The half-dimples 248b, 250b are provided between the semicircular cutouts 232, 234 and the edges 252, 254 of the arms 226, 228.

In operation, the cylindrical member 214 of the nut member 202 is positioned through the aperture 230 of the cage member 204 such that the upper surface 208 of the nut member 202 is abutted against the upper surface 220 of the base portion 224 of the cage member 204. The first and second arms 226, 228 are then bent around opposite sidewalls 210 of the nut member 202 and onto the lower surface 210 of the nut member 202 to form the cage nut assembly 200.

The free ends 236, 238 of the arms 226, 228 then abut against one another such that the half-dimples 148a, 150a abut against one another, the half-dimples 148b, 150b abut against one another, and the semicircular cutouts 232, 234 are in communication with one another to form a circular cutout 256.

Because the arms 226, 228 abut at their free ends 236, 238, the cage member 204 effectively encages the nut member 202. The cage member 204 and the aperture 230 are sized so that the nut member 202 has a limited range of movement in at least one dimension, and preferably in two dimensions, for example the "X" and "Y" axes as illustrated in FIG. 4. The circular cutout 256 is provided in the cage member 204 to allow access to the aperture 216 of the nut member 202 through the lower surface 210 thereof, within the range of movement of the nut member 202.

Once the cage nut assembly 200 is formed, the cage nut assembly 200 must then be attached to a mating surface 257. The cage nut assembly 200 is positioned on the mating surface 257 such that the dimples 240, 242, 248a, 248b, 250a, 250b are in contact with the mating surface 257. The cage nut assembly 200 is then welded to the mating surface 257 with the assistance of the dimples 240, 242. During the welding, the free-ends 236, 238 are welded together to form a welded seam 258. The half-dimples 248a, 250a; 248b, 250b also assist in the welding of the cage nut assembly 200 to the mating surface 257 and the half-dimples 248a, 250a are welded together to form a welded dimple 260a and the half-dimples 248b, 250b are welded together to form a welded dimple 260b.

Attention is now directed to FIGS. 7–9 which illustrate a cage nut assembly 300 which is in accordance with a second embodiment of the present invention. The cage nut assembly 300 includes a nut member 302 and a cage member 304.

The nut member 302 is best illustrated in FIG. 9 and includes a rectangular block 306 having a generally planar upper surface 308, a generally planar lower surface 310 and sidewalls 312 which connect the upper and lower surfaces 308, 310. An aperture 316 extends through the block 306 of the nut member 302. The aperture 316 may be closed at the lower surface 310 of the block 306 or it may extend all the way through the block 306. The aperture 316 defines an aperture wall 318 which is preferably threaded and is capable of receiving a bolt or screw (now shown) to be attached thereto.

The cage member 304 is best illustrated in FIGS. 7 and 8. The cage member 304 is used for encaging the nut member 302. Prior to encaging the nut member 302, the cage member 304 has generally upper and lower surfaces 320, 322. The cage member 304 includes a base portion 324 and bendable first and second arm portions 326, 328 extending from opposite ends of the base portion 324. The first and second arm portions 326, 328 are preferably integrally formed with the base portion 324.

As best illustrated in FIG. 8, the cage member 304 further includes a pair of L-shaped flanges 362, 364 which extend from opposite ends of the base portion 324, but not the opposite ends from which the arm portions 326, 328 extend from the base portion 324. The L-shaped flange 362 has a first portion 366 which extends perpendicularly upwardly from the base portion 324 proximate to the second arm portion 328, and a second portion 368 which extends perpendicularly from the first portion 366 toward the first arm portion 326. The L-shaped flange 364 has a first portion 370 which extends perpendicularly outwardly from the base portion 324 proximate to the first arm portion 326, and a second portion 372 which extends perpendicularly from the first portion 370 toward the second arm portion 328. The L-shaped flange 364 is bendable. The L-shaped flanges 362, 364 are preferably integrally formed with the base portion 324 of the cage member 304.

An aperture 330 is provided through the base portion 324 of the cage member 304 and the first and second arms 326, 328 have generally semicircular cutouts 332, 334 at their free ends 336, 338.

The first and second arms 326, 328 have dimples 340, 342 provided on the lower surface 322 thereof which are formed from a stamping process and which extend outwardly from the lower surface 322 thereof. The dimples 340, 342 are provided between the semicircular cutouts 332, 334 and the edges 344, 346 of the arms 326, 328.

The first and second arms 326, 328 have half-dimples 348, 350 provided on the lower surface 322 thereof at the free ends 336, 338 of the arms 326, 328. The half-dimples 348, 350 are formed from a stamping process and extend outwardly from the lower surface 322 of the arms 326, 328. The half-dimples 348, 350 are provided between the semicircular cutouts 332, 334 and the edges 352, 354 of the arms 326, 328.

In operation, the first and second arms 326, 328 are bent such that the free ends 336, 338 of the arms 326, 328 abut against one another such that the half-dimples 348, 350 abut against one another and the semicircular cutouts 332, 334 are in communication with one another to form a circular cutout 356.

The nut member 302 is then slid into the cage member 304 at the end of the cage member 304 where the L-shaped flange 364 is provided for such that the upper surface 108 of the nut member 302 is facing the upper surface 320 of the base portion 324 of the cage member 304. The L-shaped flange 362 prevents the nut member 302 from sliding out of the cage member 302. Once the nut member 302 is positioned within the cage member 304, the L-shaped flange 364 is bent to prevent the nut member 302 from sliding out of the cage member 302, thus effectively encaging the nut member 302 within the cage member 304 and forming the cage nut assembly 300, as best illustrated in FIG. 7.

The cage member 304 is sized so that the nut member 302 has a limited range of movement in at least one dimension, and preferably in two dimensions, for example the "X" and "Y" axes as illustrated in FIG. 7. The circular cutout 356 is provided in the cage member 304 to allow access to the aperture 316 of the nut member 302 through the lower surface 310 thereof, within the range of movement of the nut member 302.

Once the cage nut assembly 300 is formed, the cage nut assembly 300 must then be attached to a mating surface 357. The cage nut assembly 300 is positioned on the mating surface 357 such that the dimples 340, 342, 348, 350 are in contact with the mating surface 357. The cage nut assembly 300 is then welded to the mating surface 357 with the assistance of the dimples 340, 342. During the welding, the free-ends 336, 338 are welded together to form a welded seam 358. The half-dimples 348, 350 also assist in the welding of the cage nut assembly 300 to the mating surface 357 and are welded together to form a welded dimple 360.

It should be noted that the cage nut assembly 300 could also be formed to have four dimples, similar to that disclosed in the second embodiment of the cage nut assembly 200, rather than three dimples.

Attention is now directed to FIGS. 10–12 which illustrate a cage nut assembly 400 which is in accordance with a fourth embodiment of the present invention. The cage nut assembly 400 includes a nut member 402 and a cage member 404.

The nut member 402 is best illustrated in FIG. 12 and includes a rectangular block 406 having a generally planar upper surface 408, a generally planar lower surface 410 and sidewalls 412 which connect the upper and lower surfaces 408, 410. The nut member 402 also includes a cylindrical member 414 which extends outwardly from the upper surface 408 of the nut member 402. The cylindrical member 414 is preferably in the form of a right circular cylinder. An aperture 416 extends through the nut member 402 from the block 406 into the cylindrical member 414. The aperture 416 may be closed at the lower surface 410 of the block 406 or it may extend all the way through the block 406. The aperture 416 defines an aperture wall 418 which is preferably threaded and is capable of receiving a bolt or screw (now shown) to be attached thereto.

The cage member 404 is best illustrated in FIGS. 10–11. The cage member 404 is used for encaging the nut member 402. Prior to encaging the nut member 402, the cage member 404 has generally planar upper and lower surfaces 420, 422. The cage member 404 includes a base portion 424 and bendable first and second arm portions 426, 428 extending from opposite ends of the base portion 424. The first and second arm portions 426, 428 are preferably integrally formed with the base portion 424.

The cage member 404 further includes a pair of flanges 462, 464 which extend from opposite ends of the base portion 424, but not the opposite ends from which the arm portions 426, 428 extend from the base portion 424. The flange 462 extends perpendicularly upwardly from the base portion 424 and extends substantially between the arm portions 426, 428. The flange 464 is L-shaped such that it has a first portion 470 which extends perpendicularly outwardly from the base portion 424 proximate to the first arm portion 426, and a second portion 472 which extends perpendicularly from the first portion 470 toward the second arm portion 428. The L-shaped flange 464 is bendable. The flanges 462, 464 are preferably integrally formed with the base portion 424 of the cage member 404.

An aperture 430 is provided through the base portion 424 of the cage member 404 and the first and second arms 426, 428 have generally semicircular cutouts 432, 434 at their free ends 436, 438.

The first and second arms 426, 428 have tabs 440, 442 provided on the lower surface 422 thereof which extend outwardly from the lower surface 422 thereof. The tabs 440, 442 are provided between the semicircular cutouts 432, 434 and the edges 444, 446 of the arms 426, 428.

The first and second arms 426, 428 have half-tabs 448, 450 provided on the lower surface 422 thereof at the free ends 436, 438 of the arms 426, 428. The half-tabs 448, 450 extend outwardly from the lower surface 422 of the arms 426, 428. The half-tabs 448, 450 are provided between the semicircular cutouts 432, 434 and the edge 452, 454 of the arms 426, 428.

In operation, the cylindrical member 414 of the nut member 402 is positioned through the aperture 430 of the cage member 404 such that the upper surface 408 of the nut member 402 is abutted against the upper surface 420 of the base portion 424 of the cage member 404. The first and second arms 426, 428 are bended around opposite sidewalls 412 of the nut member 402 and onto the lower surface 410 of the nut member 402 to form the cage nut assembly 400.

The free ends 436, 438 of the arms 426, 428 then abut against one another such that the half-tabs 448, 450 abut against one another and the semicircular cutouts 432, 434 are in communication with one another to form a circular cutout 456. The tabs 440, 442 extend outwardly from the lower surface 422 of the cage member 404 at the bend of the first and second arms 426, 428 around the lower surface 410 of the nut member 402 such that the tabs 440, 442 extend in an opposite direction as does the cylindrical member 414 of the nut member 402.

Because the arms 426, 428 abut at their free ends 436, 438, the cage member 404 effectively encages the nut member 402. The cage member 404 and the aperture 430 are sized so that the nut member 402 has a limited range of movement in at least one dimension, and preferably in three dimensions, for example the "X", "Y" and "Z" axes as illustrated in FIG. 11. The circular cutout 456 is provided in the cage member 404 to allow access to the aperture 416 of the nut member 402 through the lower surface 410 thereof, within the range of movement of the nut member 402.

Once the cage nut assembly 400 is formed, the cage nut assembly 400 must then be attached to a mating surface 457. The cage nut assembly 400 is positioned on the mating surface 457 such that the tabs 440, 442, 448, 450 are in contact with the mating surface 457. The cage nut assembly 400 is then welded to the mating surface 457 with the assistance of the tabs 440, 442. During the welding, the free-ends 436, 438 are welded together to form a welded seam 458. The half-tabs 448, 450 also assist in the welding of the cage nut assembly 400 to the mating surface 457 and are welded together to form a welded tab 460.

It should be noted that the nut member 402 could be formed without the cylindrical member 414 and the cage member 404 sized so that the nut member 402 has a limited range of movement in at least one direction, and preferably in two dimensions, for example the "X" and "Y" axes as illustrated in FIG. 11.

It should further be noted that the cage nut assembly 400 could also be formed to have four tabs, similar to that disclosed in the second embodiment of the cage nut assembly 200, except with dimples, rather than three tabs.

Attention is now directed to FIGS. 13–15 which illustrate a cage nut assembly 500 which is in accordance with a fifth embodiment of the present invention. The cage nut assembly 500 includes a nut member 502 and a cage member 504.

The nut member 502 is best illustrated in FIG. 15 and includes a rectangular block 506 having a generally planar upper surface 508, a generally planar lower surface (not shown) and sidewalls 512 which connect the upper and lower surfaces 508. The nut member 502 also includes a cylindrical member 514 which extends outwardly from the upper surface 508 of the nut member 502. The cylindrical member 514 is preferably in the form of a right circular cylinder. An aperture 516 extends through the nut member 502 from the block 506 into the cylindrical member 514. The aperture 516 may be closed at the lower surface 510 of the block 506 or it may extend all the way through the block 506. The aperture 516 defines an aperture wall 518 which is preferably threaded and is capable of receiving a bolt or screw (now shown) to be attached thereto.

The cage member 504 is best illustrated in FIGS. 13 and 14. The cage member 504 is used for encaging the nut 502. Prior to encaging the nut member 502, the cage member 504 is formed such that it has a first sidewall 521 having top and bottom edges 523, 525 and first and second side ends 527, 529.

The cage member 504 further is formed to include a second side wall 531 having top and bottom edges 533, 535 and first and second side ends 537, 539. The second side wall 531 is integrally formed with the first side wall 521 such that the first side end 537 of the second side wall 531 is equivalent to the second side end 529 of the first side wall 521. The second side wall 531 extends perpendicularly along the "X" axis, as illustrated in FIG. 13, from the first side wall 521. The bottom edge 535 of the second side wall 531 is provided in the same plane as the bottom edge 525 of the first side wall 521; the top edge 533 of the second side wall 531 is provided in a different plane than the top edge 535 of the first side wall 521.

The cage member 504 further is formed to include a third side wall 541 having top and bottom edges 543, 545 and first and second side ends 547, 549. The third side wall 541 is integrally formed with the second side wall 531 such that the first side end 547 of the third side wall 541 is equivalent to the second side end 539 of the second side wall 531. Tile third side wall 541 extends perpendicularly along the "Y" axis, as illustrated in FIG. 13, from the second side wall 531 such that the third side wall 541 is parallel to the first side wall 521. The top and bottom edges 543, 545 of the third side wall 541 are provided in the same plane as the top and bottom edges 523, 525 of the first side wall 521.

The cage member 504 further is formed to include a fourth side wall 551 having top and bottom edges 553, 555 and first and second side ends 557, 559. The fourth side wall 551 is integrally formed with the third side wall 541 such that the first side end 557 of the fourth side wall 551 is equivalent to the second side end 549 of the third side wall 541. The fourth side wall 551 extends perpendicularly along the "X" axis, as illustrated in FIG. 13, from the third side wall 541 such that the fourth side wall 551 is parallel to the second side wall 531. The top and bottom edges 553, 555 of the fourth side wall 551 are provided in the same plane as the top and bottom edges 523, 525 of the first side wall 521. The second side end 559 of the fourth side wall 551 is also formed with a dove-tail pocket 561 provided therein.

The cage member 504 further includes a fifth side wall 563 having top and bottom edges 565, 567 and first and second side ends 569, 571. The fifth side wall 563 is integrally formed with the first side wall 521 such that the second side end 571 of the fifth side wall 563 is equivalent to the first side end 527 of the first side wall 521. The fifth side wall 563 extends perpendicularly along the "X" axis, as illustrated in FIG. 13, from the first side wall 521 such that the fifth side wall 563 is parallel to the second side wall 531. The top and bottom edges 565, 567 of the fifth side wall 563 are provided in the same plane as the top and bottom edges 523, 525 of the first side wall 521. The first side end 569 of the fifth side wall 563 is also formed with a dove-tail extension 573 provided thereon. The dove-tail extension 573 is inserted into the dove-tail pocket 561 in order to lock the fourth side wall 551 to the fifth side wall 563 such that the second side end 559 of the fourth side wall 551 abuts against the first side end 569 of the fifth side wall 563. A seam 575 is provided between the second side end 559 of the fourth side wall 551 and the first side end 569 of the fifth side wall 563.

A tab 540 is provided on the bottom edge 525 of the first side wall 521 proximate to the connection of the first and second side walls 521, 531. A tab 542 is provided on the bottom edge 545 of the third side wall 541 proximate to the connection of the second and third side walls 531, 541. A half tab 548 is provided on the bottom edge 555 of the fourth side wall 551 proximate to the connection of the fourth and fifth side walls 551, 563. A half tab 550 is provided on the bottom edge 567 of the fifth side wall 563 proximate to the connection of the fourth and fifth side walls 551, 563. The half tabs 548, 550 abut against one another such that the seam 575 is provided therebetween.

A first flap 577 extends from the top edge 523 of the first side wall 521 and has a generally semicircular cutout 579 at its free end 581. The first flap 577 is bendable. A second flap 583 extends from the top edge 543 of the third side wall 541 and has a generally semicircular cutout 585 at its free end 587. The second flap 583 is bendable. The first and second flaps 577, 583 are bent toward one another such that the free ends 581, 587 abut against one another and such that the semicircular cutouts 579, 585 are in communication with one another to form a circular cutout 589.

A window 591 is provided between the first, second and third side walls 521, 531, 541 and the flaps 577, 583. A flange 593 covers a portion of the window 591 and extends from the connection of the second and third side walls 531, 541. The flange 593 is bendable.

The first side wall 521 also has a fold-out arm 595 provided thereon which is integrally formed with the first side wall 521 and is positioned equidistant from the first and second side ends 527, 529 of the first side wall 521. The fold-out arm 595 is also bendable. The third side wall 541 also has a fold-out arm 597 provided thereon which is integrally formed with the third side wall 541 and is positioned equidistantly from the first and second side ends 547, 549 of the third side wall 541. The fold out arm 597 is further bendable.

In operation, nut member 502 is positioned between the sidewalls 521, 531, 541, 551, 563 of the cage member 504 such that the cylindrical member 514 of the nut member 502 is positioned through the circular cutout 589 of the cage member 504. The fold-out arms 595. 597 are then bended to abut against the lower surface 510 of the nut member 502 to form the cage nut assembly 500, such that the cage member 504 effectively encages the nut member 502. The cage member 504 and the circular cutout 589 are sized so that the nut member 502 has a limited range of movement in at least one dimension, and preferably in two dimensions, for example the "X" and "Y" axes as illustrated in FIG. 13.

Once the cage nut assembly 500 is formed, the cage nut assembly 500 must then be attached to a mating surface 557. The cage nut assembly 500 is positioned on the mating surface 557 such that the tabs 540, 542, 548, 550 are in contact with the mating surface 557. The cage nut assembly 500 is then welded to the mating surface 557 with the assistance of the tabs 540, 542. During the welding, the fourth and fifth sidewalls 551, 563 are welded together along the seam 575. The half-tabs 548, 550 also assist in the welding of the cage nut assembly 500 to the mating surface 557 and are welded together to form a welded tab 560.

The window 591 acts as a nut member removal window for servicing the nut member 502 if need be. The flange 593 acts to help retain the nut member 502 within the cage member 504, but also can be bended outwardly to provide access to the nut member 502 if the nut member 502 needs to be serviced.

It should be noted that the nut member 502 could be formed without the cylindrical member 514 and the cage member 504 sized so that the nut member 502 has a limited range of movement in at least one direction, and preferably in two dimensions, for example the "X" and "Y" axes as illustrated in FIG. 13.

Attention is now directed to FIGS. 16–18 which illustrate a cage nut assembly 600 which is in accordance with a sixth embodiment of the present invention. The cage nut assembly 600 includes a nut member 602 and a cage member 604.

The nut member 602 is best illustrated in FIG. 18 and includes a rectangular block 606 having a generally planar upper surface 608, a generally planar lower surface 610 and sidewalls 612 which connect the upper and lower surfaces 608, 610. The nut member 602 also includes a cylindrical member 614 which extends outwardly from the upper surface 608 of the nut member 602. The cylindrical member 614 is preferably in the form of a right circular cylinder. An aperture 616 extends through the nut member 602 from the block 606 into the cylindrical member 614. The aperture 616 may be closed at the lower surface 610 of the block 606 or it may extend all the way through the block 606. The aperture 616 defines an aperture wall 618 which is preferably threaded and is capable of receiving a bolt or screw (now shown) to be attached thereto.

The cage member 604 is best illustrated in FIGS. 16–17. The cage member 604 is used for encaging the nut 602. Prior to encaging the nut member 602, the cage member 604 is formed such that it has a first sidewall 621 having top and bottom edges 623, 625 and first and second side ends 627, 629.

The cage member 604 further is formed to include a second side wall 631 having top and bottom edges 633, 635 and first and second side ends 637, 639. The second side wall 631 is integrally formed with the first side wall 621 such that the first side end 637 of the second side wall 631 is equivalent to the second side end 629 of the first side wall 621. The second side wall 631 extends perpendicularly along the "X" axis, as illustrated in FIG. 16, from the first side wall 621. The bottom edge 636 of the second side wall 631 is provided in the same plane as the bottom edge 625 of the first side wall 621; the top edge 633 of the second side wall 631 is provided in a different plane than the top edge 623 of the first side wall 621.

The cage member 604 further is formed to include a third side wall 641 having top and bottom edges 643, 645 and first and second side ends 647, 649. The third side wall 641 is integrally formed with the second side wall 631 such that the first side end 647 of the third side wall 641 is equivalent to the second side end 639 of the second side wall 631. The third side wall 641 extends perpendicularly along the "Y" axis, as illustrated in FIG. 16, from the second side wall 631 such that the third side wall 641 is parallel to the first side wall 621. The top and bottom edges 643, 645 of the third side wall 641 are provided in the same plane as the top and bottom edges 623, 625 of the first side wall 621.

The cage member 604 further is formed to include a fourth side wall 651 having top and bottom edges 653, 655 and first and second side ends 657, 659. The fourth side wall 651 is integrally formed with the third side wall 641 such that the first side end 657 of the fourth side wall 651 is equivalent to the second side end 649 of the third side wall 641. The fourth side wall 651 extends perpendicularly along the "X" axis, as illustrated in FIG. 16, from the third side wall 641 such that the fourth side wall 651 is parallel to the second side wall 631. The top and bottom edges 653, 655 of the fourth side wall 651 are provided in the same plane as the top and bottom edges 623, 625 of the first side wall 621. The second side end 659 of the fourth side wall 651 is also formed with a dove-tail pocket 661 provided therein.

The cage member 604 further includes a fifth side wall 663 having top and bottom edges 665, 667 and first and second side ends 669, 671. The fifth side wall 663 is integrally formed with the first side wall 621 such that the second side end 671 of the fifth side wall 663 is equivalent to the first side end 627 of the first side wall 621. The fifth side wall 663 extends perpendicularly along the "X" axis, as illustrated in FIG. 16, from the first side wall 621 such that the fifth side wall 663 is parallel to the second side wall 631. The top and bottom edges 665, 667 of the fifth side wall 663 are provided in the same plane as the top and bottom edges 623, 625 of the first side wall 621. The first side end 669 of the fifth side wall 663 is also formed with a dove-tail extension 673 provided thereon. The dove-tail extension 673 is inserted into the dove-tail pocket 661 in order to lock the fourth side wall 651 to the fifth side wall 663 such that the second side end 659 of the fourth side wall 651 abuts against the first side end 669 of the fifth side wall 663. A seam 675 is provided between the second side end 659 of the fourth side wall 651 and the first side end 669 of the fifth side wall 663.

A tab 640 is provided on the bottom edge 625 of the first side wall 621 proximate to the connection of the first and second side walls 621, 631. A tab 642 is provided on the bottom edge 645 of the third side wall 641 proximate to the connection of the second and third side walls 631, 641. A tab 699 is provided on the bottom edge 667 of the fifth side wall 663 proximate to the connection of the fourth and fifth side walls 651, 663. The tab 699 abuts against the bottom edge 655 of the fourth side wall 651 proximate to the connection of the fourth and fifth side walls 651, 663 such that the seam 675 is provided therebetween.

A first flap 677 extends from the top edge 623 of the first side wall 621 and has a generally semicircular cutout 679 at its free end 681. The first flap 677 is bendable. A second flap 683 extends from the top edge 643 of the third side wall 641 and has a generally semicircular cutout 685 at its free end 687. The second flap 683 is bendable. The first and second flaps 677, 683 are bent toward one another such that the free ends 681, 687 abut against one another and such that the semicircular cutouts 679, 685 are in communication with one another to form a circular cutout 689.

A window 691 is provided between the first, second and third side walls 621, 631, 641 and the flaps 677, 683. A flange 693 covers a portion of the window 691 and extends from the connection of the second and third side walls 631, 641. The flange 693 is bendable.

The first side wall 621 also has a fold-out arm 695 provided thereon which is integrally formed with the first side wall 621 and is positioned equidistant from the first and second side ends 627, 629 of the first side wall 621. The fold-out arm 695 is also bendable. The third side wall 641 also has a fold-out arm 697 provided thereon which is integrally formed with the third side wall 641 and is positioned equidistantly from the first and second side ends 647, 649 of the third side wall 641. The fold out arm 697 is further bendable.

In operation, nut member 602 is positioned between the sidewalls 621, 631, 641, 651, 663 of the cage member 604 such that the cylindrical member 614 of the nut member 602 is positioned through the circular cutout 689 of the cage member 604. The fold-out arms 695, 697 are then bended to abut against the lower surface 610 of the nut member 602 to form the cage nut assembly 600, such that the cage member 604 effectively encages the nut member 602. The cage member 604 and the circular cutout 689 are sized so that the nut member 602 has a limited range of movement in at least one dimension, and preferably in two dimensions, for example the "X" and "Y" axes as illustrated in FIG. 16.

Once the cage nut assembly 600 is formed, the cage nut assembly 600 must then be attached to a mating surface 657. The cage nut assembly 600 is positioned on the mating surface 657 such that the tabs 640, 642, 699 are in contact with the mating surface 657. The cage nut assembly 600 is then welded to the mating surface 657 with the assistance of the tabs 640, 642. During the welding, the fourth and fifth sidewalls 651, 663 are welded together along the seam 675. The tab 699 also assists in the welding of the cage nut assembly 600 to the mating surface 657 and is welded to the bottom surface 655 of the fourth side wall 651 to form a welded tab 660.

The window 691 acts as a nut member removal window for servicing the nut member 602 if need be. The flange 693 acts to help retain the nut member 602 within the cage member 604, but also can be bended outwardly to provide access to the nut member 602 if the nut member 602 needs to be serviced.

It should be noted that the nut member 602 could be formed without the cylindrical member 614 and the cage member 604 sized so that the nut member 602 has a limited range of movement in at least one direction, and preferably in two dimensions, for example the "X" and "Y" axes as illustrated in FIG. 16.

Attention is now directed to FIGS. 19–21 which illustrate a cage nut assembly 700 which is in accordance with a seventh embodiment of the present invention. The cage nut assembly 700 includes a nut member 702 and a cage member 704.

The nut member 702 is best illustrated in FIG. 21 and includes a rectangular block 706 having a generally planar upper surface 708, a generally planar lower surface (not shown) and sidewalls 712 which connect the upper and lower surfaces 708. An aperture 716 extends through the block 706 of the nut member 702. The aperture 716 may be closed at the lower surface 710 of the block 706 or it may extend all the way through the block 706. The aperture 716 defines an aperture wall 718 which is preferably threaded and is capable of receiving a bolt or screw (now shown) to be attached thereto.

The cage member 704 is best illustrated in FIGS. 19–20. The cage member 704 is used for encaging the nut 702. Prior to encaging the nut member 702, the cage member 704 is formed such that it has a first sidewall 721 having top and bottom edges 723, 725 and first and second sides 727, 729.

The cage member 704 further is formed to include a second side wall 731 having top and bottom edges 733, 735 and first and second side ends 737, 739. The second side wall 731 is integrally formed with the first side wall 721 such that the first side end 737 of the second side wall 731 is equivalent to the second side end 729 of the first side wall 721. The second side wall 731 extends perpendicularly along the "X" axis, as illustrated in FIG. 21, from the first side wall 721. The bottom edge 735 of the second side wall 731 is provided in the same plane as the bottom edge 725 of the first side wall 721; the top edge 733 of the second side wall 731 is provided in a different plane than the top edge 722 of the first side wall 721.

The cage member 704 further is formed to include a third side wall 741 having top and bottom edges 743, 745 and first and second side ends 747, 749. The third side wall 741 is integrally formed with the second side wall 731 such that the first side end 747 of the third side wall 741 is equivalent to the second side end 739 of the second side wall 731. The third side wall 741 extends perpendicularly along the "Y" axis, as illustrated in FIG. 19, from the second side wall 731 such that the third side wall 741 is parallel to the first side wall 721. The top and bottom edges 743, 745 of the third side wall 741 are provided in the same plane as the top and bottom edges 723, 725 of the first side wall 721.

The cage member 704 further is formed to include a fourth side wall 751 having top and bottom edges 753, 755 and first and second side ends 757, 759. The fourth side wall 751 is integrally formed with the third side wall 741 such that the first side end 757 of the fourth side wall 751 is equivalent to the second side end 749 of the third side wall 741. The fourth side wall 751 extends perpendicularly along the "X" axis, as illustrated in FIG. 19, from the third side wall 741 such that the fourth side wall 751 is parallel to the second side wall 731. The top and bottom edges 753, 755 of the fourth side wall 751 are provided in the same plane as the top and bottom edges 723, 725 of the first side wall 721. The second side end 759 of the fourth side wall 751 is also formed with a dove-tail pocket 761 provided therein.

The cage member 704 further includes a fifth side wall 763 having top and bottom edges 765, 767 and first and second side ends 769, 771. The fifth side wall 763 is integrally formed with the first side wall 721 such that the second side end 771 of the fifth side wall 763 is equivalent to the first side end 727 of the first side wall 721. The fifth side wall 763 extends perpendicularly along the "X" axis, as illustrated in FIG. 19, from the first side wall 721 such that the fifth side wall 763 is parallel to the second side wall 731. The top and bottom edges 765, 767 of the fifth side wall 763 are provided in the same plane as the top and bottom edges 723, 725 of the first side wall 721. The first side end 769 of the fifth side wall 763 is also formed with a dove-tail extension 773 provided thereon. The dove-tail extension 773 is inserted into the dove-tail pocket 761 in order to lock the fourth side wall 751 to the fifth side wall 763 such that the second side end 759 of the fourth side wall 751 abuts against the first side end 769 of the fifth side wall 763. A seam 775 is provided between the second side end 759 of the fourth side wall 751 and the first side end 769 of the fifth side wall 763.

A tab 740 is provided on the bottom edge 725 of the first side wall 721 proximate to the connection of the first and second side walls 721, 731. A tab 742 is provided on the bottom edge 745 of the third side wall 741 proximate to the connection of the second and third side walls 731, 741. A half tab 748 is provided on the bottom edge 755 of the fourth side wall 751 proximate to the connection of the fourth and fifth side walls 751, 763. A half tab 750 is provided on the bottom edge 767 of the fifth side wall 763 proximate to the connection of the fourth and fifth side walls 751, 763. The half tabs 748, 750 abut against one another such that the seam 775 is provided therebetween.

A first flap 777 extends from the top edge 723 of the first side wall 721 and has a generally semicircular cutout 779 at its free end 781. The first flap 777 is bendable. A second flap 783 extends from the top edge 743 of the third side wall 741 and has a generally semicircular cutout 785 at its free end 787. The second flap 783 is bendable. The first and second flaps 777, 783 are bent toward one another such that the free ends 781, 787 abut against one another and such that the semicircular cutouts 779, 785 are in communication with one another to form a circular cutout 789.

A third flap 778 extends from the bottom edge 725 of the first side wall 721 and has a generally semicircular cutout 780 at its free end 782. The third flap 778 is bendable. A fourth flap 784 extends from the bottom edge 745 of the third side wall 741 and has a generally semicircular cutout 786 at its free end 788. The fourth flap 784 is bendable. The third and fourth flaps 778, 784 are bent toward one another such that the free ends 782, 788 abut against one another and such that the semicircular cutouts 780, 786 are in communication with one another to form a circular cutout 790.

A window 791 is provided between the first, second and third side wall 721, 731, 741 and the flaps 777, 783, 778, 784. A flange 793 covers a portion of the window 791 and extends from the connection of the second and third side walls 731, 741. The flange 793 is bendable.

In operation, the nut member 702 is slid into the cage member 704 through the window 791 such that the nut member 702 is positioned between the sidewalls 721, 731, 741, 751, 763 and the flaps 777, 783, 778, 784, and such that the aperture 716 of the nut member 718 is accessible through either of the circular cutouts 789, 790. The flange 793 is then bended to be positioned parallel with the second side wall 731 in order to cover a portion of the window 791 and to help retain the nut member 702 within the cage member 704. The cage member 704 effectively encages the nut member 702 and is sized so that the nut member 702 has a limited range of movement in at least one dimension, and preferably in two dimensions, for example the "X" and "Y" axes as illustrated in FIG. 19.

Once the cage nut assembly 700 is formed, the cage nut assembly 700 must then be attached to a mating surface 757. The cage nut assembly 700 is positioned on the mating surface 757 such that the tabs 740, 742, 748, 750 are in contact with the mating surface 757. The cage nut assembly 700 is then welded to the mating surface 757 with the assistance of the tabs 740, 742. During the welding, the fourth and fifth sidewalls 751, 763 are welded together along the seam 775. The half-tabs 748, 750 also assist in the welding of the cage nut assembly 700 to the mating surface 757 and are welded together to form a welded tab 760.

The window 791 acts as a nut member removal window for servicing the nut member 702 if need be. The flange 793 can be bended outwardly to provide access to the nut member 702 if the nut member 702 needs to be serviced.

Thus, the welding of the cage nut assemblies 100, 200, 300, 400, 500, 600, 700 to the mating surface 157, 257, 357, 457, 557, 657, 757 provides a 4-sided continuous box, because of the welded seams 158, 258, 358, 458, 558, 658, 758, and the welded dimples and tabs 160, 260, 360, 460, 560, 660, 760, which has improved strength characteristics in comparison to cage nut assemblies of the prior art. Because the cage nut assemblies 100, 200, 300, 400, 500, 600, 700 has improved strength characteristics, the cage nut assemblies 100, 200, 300, 400, 500, 600, 700 can be formed with material that is formed with a maximum thickness of 1.8 millimeters whereas the prior art cage nut assemblies were formed with a minimum thickness of 2.0 millimeters. Thus, the cage nut assemblies 100, 200, 300, 400, 500, 600, 700 provides for at least a 10% decrease in the thickness of the material used to form the cage nut assemblies 100, 200, 300, 400, 500, 600, 700, such that substantial savings in cost are realized in the manufacture of the cage nut assemblies 100, 200, 300, 400, 500, 600, 700.

Figure 23:
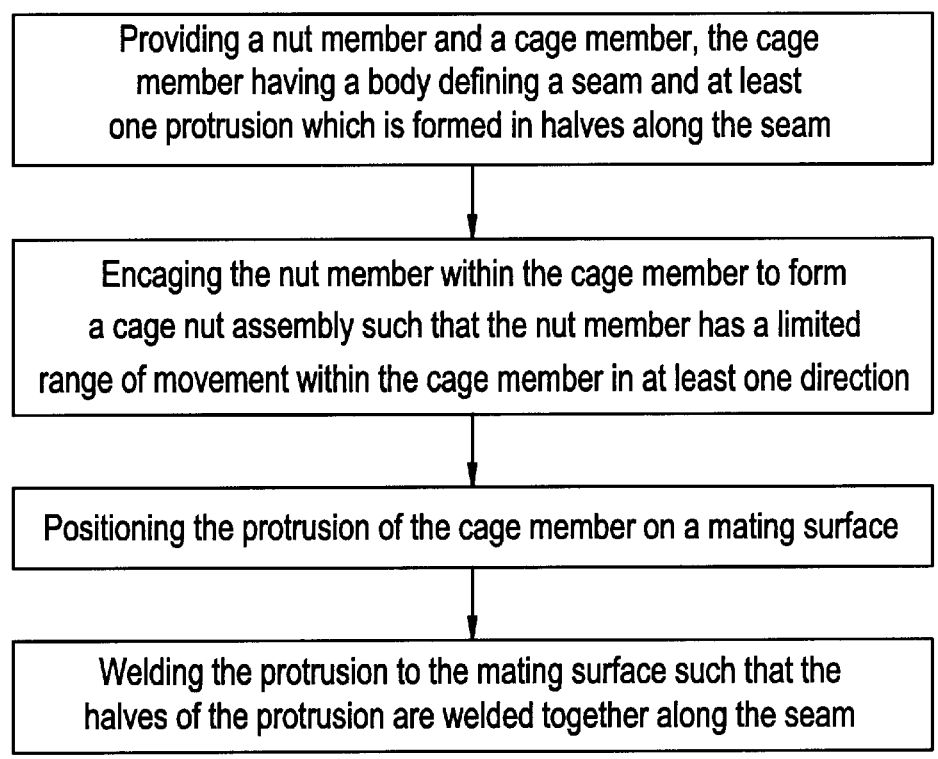
FIG. 23 illustrates a method of attaching a cage nut assembly shown in FIGS. 1, 4, 7, 10, 13 and 19 to a mating surface.
Figure 24:
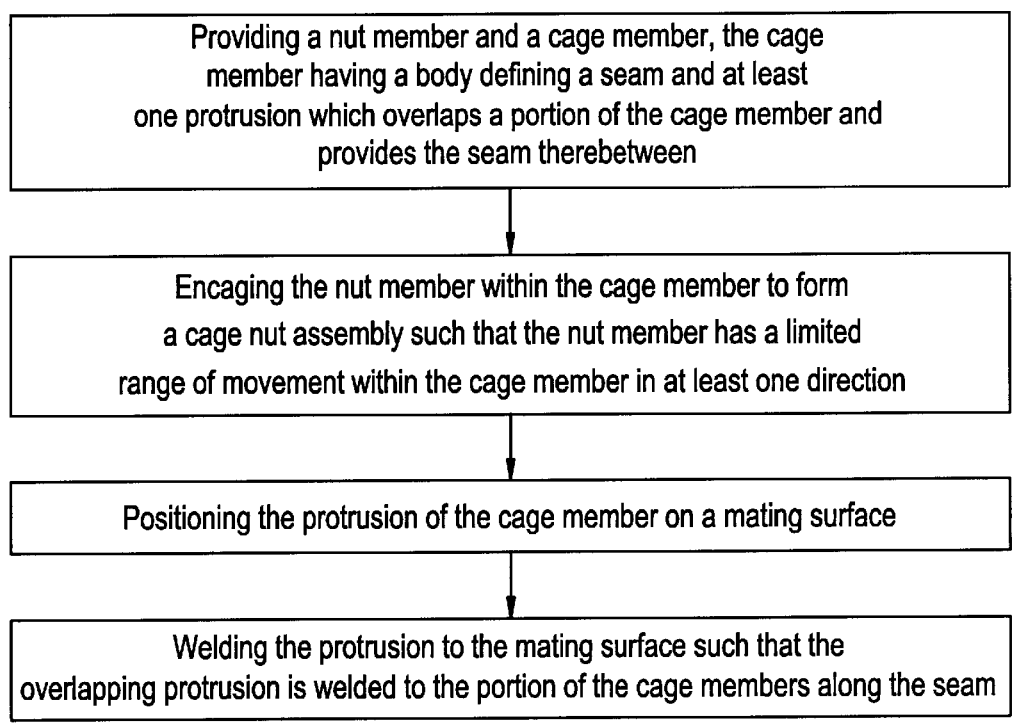
FIG. 24 illustrates a method of attaching a cage nut assembly shown in FIG. 16 to a mating surface.

FIG. 22 illustrates a method of attaching the cage member 104, 204, 304, 404, 504 and 704 to the mating surface 157, 257, 357, 457, 557, 757. FIG. 23 illustrates a method of attaching the cage nut assembly 100, 200, 300, 400, 500 and 700 to the mating surface 157, 257, 357, 457, 557, 757. FIG. 24 illustrates a method of attaching the cage nut assembly 600 to the mating surface 657.

Thus, the figures show several embodiments and methods of the present invention. Each embodiment provides a cage nut assembly 100, 200, 300, 400, 500, 600, 700 which is configured such that it can have a cage member 104, 204, 304, 404, 504, 604, 704 with a relatively thin wall thickness, yet meet torque requirements in a desired application. Each embodiment also provides a cage nut assembly 100, 200, 300, 400, 500, 600, 700 which is relatively inexpensive to manufacture but which meets torque requirements in a desired application. Further, each embodiment provides a cage nut assembly 100, 200, 300, 400, 500, 600, 700 which can be utilized in any nut application that requires a nut member 102, 202, 302, 402, 502, 602, 702 to have an "X" and "Y" axis adjustability.

While several specific embodiments of the present invention are shown and described, it is envisioned that those skilled in the art may devise various modifications without departing from the spirit and scope of the foregoing description.

The invention is claimed as follows:

1. A cage member engageable with a nut member having a threaded aperture, thereby providing a cage nut assembly, said cage member comprising a body configured to encage the nut member and having an aperture formed therein, said aperture configured to allow access to the threaded aperture of the nut member when the nut member is generally encaged by said cage member, said body defining a seam and having at least one protrusion, said protrusion being formed in halves which abut against one another such that said seam is provided therebetween, said protrusion configured to provide that said protrusion is weldable to a mating surface to secure said cage member to the mating surface, and, substantially contemporaneously, said halves of said protrusion configured to provide that said halves are weldable to one another along said seam.

2. A cage member as defined in claim 1, wherein said body defines three protrusions with one of said three protrusions being formed in halves which abut against one another.

3. A cage member as defined in claim 2, wherein each of said protrusions are formed as dimples.

4. A cage member as defined in claim 2, wherein each of said protrusions are formed as tabs.

5. A cage member as defined in claim 1, wherein said body defines four protrusions with two of said four protrusions being formed in halves which abut against one another.

6. A cage member as defined in claim 5, wherein each of said protrusions are formed as dimples.

7. A cage member as defined in claim 1, wherein said body has a base portion configured to support the nut member and a pair of arms extending from opposite ends of said base portion which are configured to bend around the nut member to encage the nut member, said aperture of said body being provided through said base portion thereof, each said arm having a free end, each said arm having said halves of said at least one protrusion provided thereon which abut against one another to provide said seam therebetween, said seam further being provided between said free ends of said arms.

8. A cage member as defined in claim 7, wherein flange members extend from opposite ends of said base portion between said arms toward said seam, at least one of said flange members being bendable, said flange members configured to limit a range of movement of the nut member when the nut member is encaged within the cage member.

9. A cage member as defined in claim 1, wherein said body has a plurality of sidewalls which are integrally formed, two of said sidewalls having free ends which abut against one another and which have said halves of said at least one protrusion extending therefrom along said free ends such that said seam is provided between said halves of said at least one protrusion and between said free ends of said two sidewalls.

10. A cage member as defined in claim 9, wherein one of said sidewalls having a free end has a dove-tail pocket provided therein and wherein said other one of said sidewalls having a free-end has a dove-tail extension provided thereon which is capable of being positioned within said dove-tail pocket to interlock said two sidewalls together.

11. A cage member as defined in claim 9, wherein two of said sidewalls have flaps extending therefrom having free ends thereon which abut against one another, each said flap having semicircular cutouts at said free ends thereof which are in communication with one another to form a circular cutout.

12. A cage member as defined in claim 9, wherein a nut servicing window is provided proximate to one of said sidewalls and wherein a flange is provided which covers a portion of said window and which is bendable to allow access to the nut member when the nut member is encaged within said cage member.

13. A cage member as defined in claim 9, wherein two of said sidewalls have foldable arms extending therefrom which are configured to fold around a lower surface of the nut member to support the nut member when the nut member is encaged within said cage member.

14. A cage nut assembly comprising:
   a nut member having a threaded aperture therethrough; and
   a cage member having a body configured to encage said nut member and having an aperture formed therein, said aperture configured to allow access to said threaded aperture of said nut member when said nut member is generally encaged by said cage member, said body defining a seam and having at least one protrusion, said protrusion being formed in halves which abut against one another such that said seam is provided therebetween, said protrusion configured to provide that said protrusion is weldable to a mating surface to secure said cage member to the mating surface, and, substantially contemporaneously, said halves of said protrusion configured to provide that said halves are weldable to one another along said seam.

15. A cage nut assembly as defined in claim 14, wherein said body of said cage member has a plurality of sidewalls which are integrally formed, two of said sidewalls having free ends which abut against one another to provide said seam therebetween, one of said protrusions being formed on an edge of one of said two sidewalls at said free end thereof such that said one protrusion overlaps onto an edge of said other of said two sidewalls at said free end thereof.

16. A method of attaching a cage member of a cage nut assembly to a mating surface, said method comprising the steps of:
   a) providing said cage member, said cage member having a body configured to allow access to a threaded aperture of a nut member when the nut member is generally encaged by said cage member, said body defining a seam and having at least one protrusion said protrusion being formed in halves which abut against one another such that said seam is provided therebetween;
   b) positioning said protrusions of said cage member on the mating surface;
   c) welding said protrusion to the mating surface such that said halves of said protrusion are welded together along said seam.

17. A method of attaching a cage nut assembly to a mating surface, said method comprising the steps of:
   a) providing a nut member and a cage member, said cage member having a body defining a seam and at least one protrusion which is formed in halves along said seam;

b) encaging said nut member within said cage member to form said cage nut assembly such that said nut member has a limited range of movement within said cage member in at least one direction;

c) positioning said protrusion of said cage member on the mating surface;

d) welding said protrusion to the mating surface such that said halves of said protrusion are welded together along said seam.

18. A method of attaching a cage nut assembly to a mating surface, said method comprising the steps of:

a) providing a nut member and a cage member, said cage member having a body defining a seam and at least one protrusion which overlaps a portion of said cage member and provides said seam therebetween;

b) encaging said nut member within said cage member to form said cage nut assembly such that said nut member has a limited range of movement within said cage member in at least one direction;

c) positioning said protrusion of said cage member on the mating surface;

d) welding said protrusion to the mating surface such that said overlapping protrusion is welded to said portion of said cage member along said seam.

\* \* \* \* \*